(12) United States Patent
Gormley

(10) Patent No.: US 11,867,136 B2
(45) Date of Patent: Jan. 9, 2024

(54) VARIABLE AREA NOZZLE ASSEMBLY AND METHOD FOR OPERATING SAME

(71) Applicant: Rohr, Inc., Chula Vista, CA (US)

(72) Inventor: Timothy Gormley, Bonita, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 17/554,874

(22) Filed: Dec. 17, 2021

(65) Prior Publication Data

US 2023/0193853 A1   Jun. 22, 2023

(51) Int. Cl.
*F02K 1/12* (2006.01)
*F02K 1/36* (2006.01)
*F02K 1/62* (2006.01)

(52) U.S. Cl.
CPC .............. *F02K 1/1215* (2013.01); *F02K 1/36* (2013.01); *F02K 1/62* (2013.01); *F05D 2240/128* (2013.01); *F05D 2260/50* (2013.01); *F05D 2260/601* (2013.01)

(58) Field of Classification Search
CPC . F02K 1/1215; F02K 1/36; F02K 1/38; F02K 1/383; F02K 1/46; F02K 1/70; F02K 1/72; F02K 1/123; F02K 1/15; F05D 2260/56; F05D 2250/323; F05D 2250/324
See application file for complete search history.

(56) References Cited

U.S. PATENT DOCUMENTS

| | | | |
|---|---|---|---|
| 2,972,860 A | 2/1961 | Moy | |
| 3,346,193 A * | 10/1967 | Tumicki | F02K 1/18 239/265.17 |
| 3,456,881 A * | 7/1969 | Beitler | F02K 1/15 417/440 |
| 3,722,797 A * | 3/1973 | Hammill | F02K 1/36 239/265.17 |
| 3,747,855 A | 7/1973 | Vdoviak | |
| 3,814,323 A * | 6/1974 | Leynaert | F02K 1/16 239/265.17 |
| 3,973,731 A | 8/1976 | Thayer | |
| 4,502,637 A | 3/1985 | Nightingale | |
| 4,805,840 A | 2/1989 | Tape | |

(Continued)

FOREIGN PATENT DOCUMENTS

FR  2153146 B1  1/1977

OTHER PUBLICATIONS

EP search report for EP22214736.5 dated May 8, 2023.

*Primary Examiner* — Andrew H Nguyen
(74) *Attorney, Agent, or Firm* — Getz Balich LLC

(57) ABSTRACT

A variable area nozzle assembly for a gas turbine engine includes a fixed structure including a first fixed ring and a second fixed ring. The second fixed ring is spaced axially aft from the first fixed ring to define a first portion of an ejector passage therebetween. A nozzle defines an inner radial exhaust flow path surface. The nozzle includes a forward ejector door and an aft ejector door. The forward ejector door and the aft ejector door define a first surface portion of the inner radial exhaust flow path surface. Each of the forward ejector door and the aft ejector door are pivotable between respective closed positions and respective open positions. A translating ejector sleeve is mounted within the fixed structure and configured to axially translate within the fixed structure between a first axial position and a second axial position.

15 Claims, 8 Drawing Sheets

(56) References Cited

U.S. PATENT DOCUMENTS

| | | | |
|---|---|---|---|
| 5,470,020 A | 11/1995 | Brossier | |
| 5,826,794 A | 10/1998 | Rudolph | |
| 5,884,843 A * | 3/1999 | Lidstone | F02K 1/36 239/265.17 |
| 2016/0003187 A1* | 1/2016 | Roberge | F02K 1/1292 415/1 |
| 2018/0094605 A1* | 4/2018 | Rosenau | F02K 1/763 |

* cited by examiner

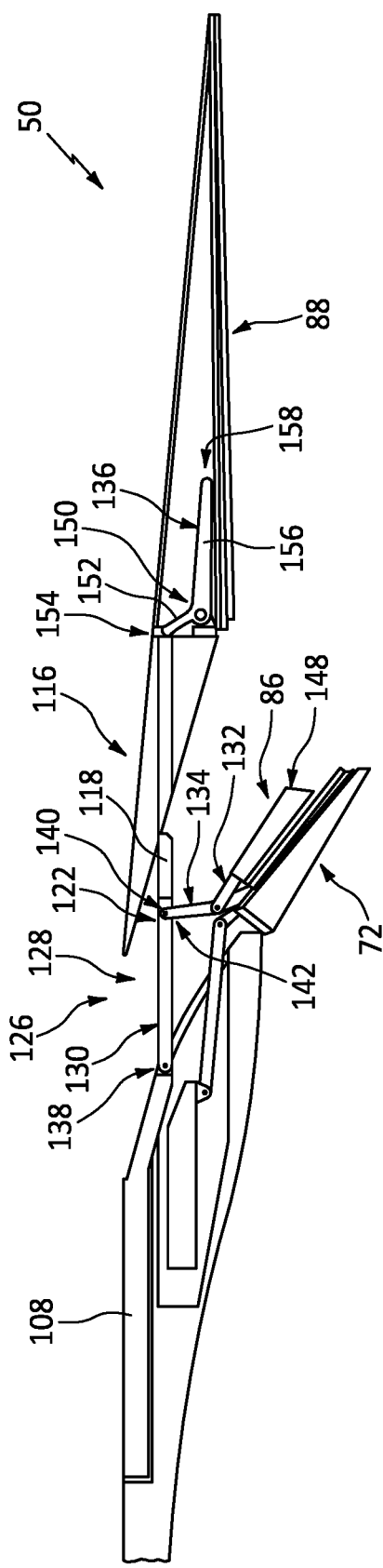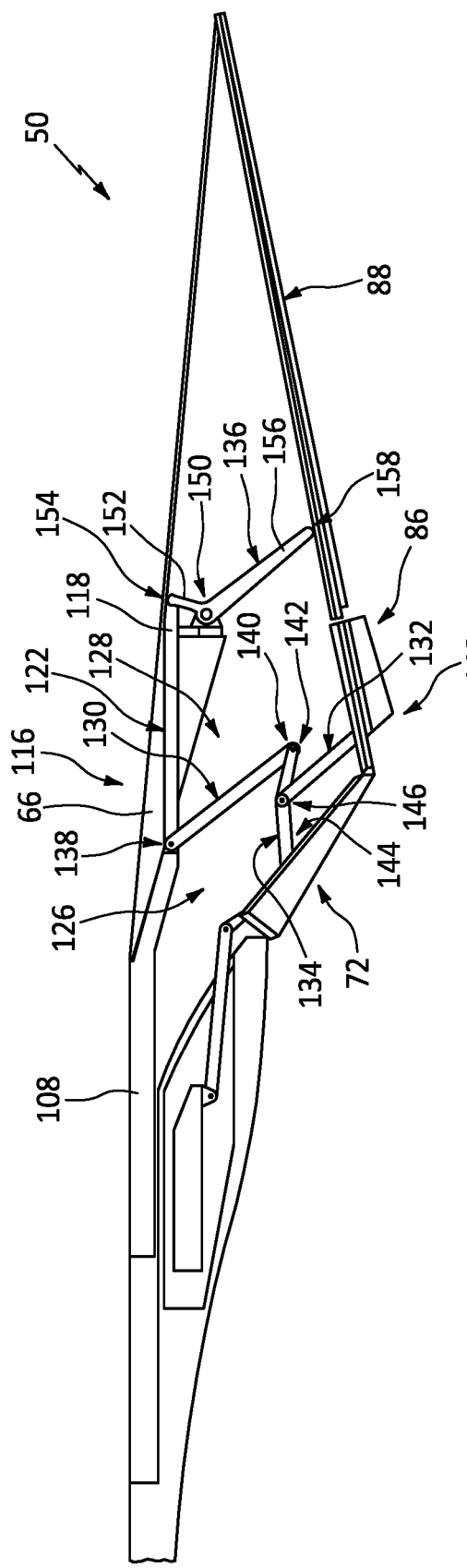

VARIABLE AREA NOZZLE ASSEMBLY AND METHOD FOR OPERATING SAME

BACKGROUND

1. Technical Field

This disclosure relates generally to aircraft gas turbine engines, and more particularly to variable area nozzle assemblies for gas turbine engines.

2. Background Information

Turbojet engines for aircraft may frequently include variable area exhaust nozzles to accommodate subsonic, transonic, and supersonic speeds. Due to the different properties of exhaust gases as they flow through the nozzle at different speeds, there may be a need to vary the area of the nozzle at one or more locations within the nozzle in order to ensure proper and efficient turbojet operation over a range of aircraft flight conditions. In some cases, it may also be desirable to introduce ambient air to the nozzle exhaust within the nozzle to improve engine efficiency. What is needed are variable area nozzle assemblies which improve upon variable area nozzle assemblies conventionally known in the art.

SUMMARY

It should be understood that any or all of the features or embodiments described herein can be used or combined in any combination with each and every other feature or embodiment described herein unless expressly noted otherwise.

According to an aspect of the present disclosure, a variable area nozzle assembly for a gas turbine engine includes a fixed structure including a first fixed ring and a second fixed ring disposed about a nozzle centerline. The second fixed ring is spaced axially aft from the first fixed ring to define a first portion of an ejector passage therebetween. The variable area nozzle assembly further includes a nozzle disposed about the nozzle centerline and defining an inner radial exhaust flow path surface. The nozzle includes a forward ejector door and an aft ejector door disposed about the nozzle centerline. The forward ejector door and the aft ejector door define a first surface portion of the inner radial exhaust flow path surface. Each of the forward ejector door and the aft ejector door are pivotable between respective closed positions, in which the forward ejector door is positioned adjacent the aft ejector door, and respective open positions, in which the forward ejector door and the aft ejector door are spaced from one another to define a second portion of the ejector passage therebetween. The variable area nozzle assembly further includes a translating ejector sleeve mounted within the fixed structure and configured to axially translate within the fixed structure between a first axial position, in which the ejector passage is closed, and a second axial position, in which the ejector passage is open such that the ejector passage is configured to allow air flow therethrough from radially outside the fixed structure to radially inside the nozzle.

In any of the aspects or embodiments described above and herein, the translating ejector sleeve may be configured to effect pivoting of the forward ejector door and the aft ejector door such that axial translation of the translating ejector sleeve from the first axial position to the second axial position causes the forward ejector door and the aft ejector door to pivot from the respective closed positions to the respective open positions.

In any of the aspects or embodiments described above and herein, an aft end of the aft ejector door may define an outlet cross-sectional area of the nozzle.

In any of the aspects or embodiments described above and herein, the nozzle may further include a seal member positioned between the forward ejector door and the aft ejector door and configured to provide a seal between the forward ejector door and the aft ejector door when the forward ejector door and the aft ejector door are in the respective closed positions.

In any of the aspects or embodiments described above and herein, the nozzle may further include an A8 door pivotably mounted to the first fixed ring. The A8 door may define a second surface portion of the inner radial exhaust flow path surface. The A8 door may be selectively pivotal relative to the nozzle centerline between a first A8 position defining a maximum area of a throat cross-sectional area of the nozzle and a second A8 position defining a minimum area of the throat cross-sectional area of the nozzle.

In any of the aspects or embodiments described above and herein, the forward ejector door may be pivotably mounted to the A8 door.

In any of the aspects or embodiments described above and herein, the variable area nozzle assembly may further include a first thrust reverser door and a second thrust reverser door. Each of the first thrust reverser door and the second thrust reverser door may be rotatably mounted to the fixed structure at a first thrust reverser door end.

In any of the aspects or embodiments described above and herein, the aft ejector door may be pivotably mounted to the first thrust reverser door and the second thrust reverser door.

In any of the aspects or embodiments described above and herein, a second thrust reverser door end of each of the first thrust reverser door and the second thrust reverser door may be configured to contact the second fixed ring when the first thrust reverser door and the second thrust reverser door are in respective stowed positions.

In any of the aspects or embodiments described above and herein, the aft ejector door may be configured to rotate with the first thrust reverser door and the second thrust reverser door from the respective stowed positions of the first thrust reverser door and the second thrust reverser door to respective deployed positions of the first thrust reverser door and the second thrust reverser door.

According to another aspect of the present disclosure, a variable area nozzle assembly for a gas turbine engine includes a fixed structure disposed about a nozzle centerline and defining a first portion of an ejector passage extending from an outer radial side of the fixed structure to an inner radial side of the fixed structure. The variable area nozzle assembly further includes a nozzle disposed about the nozzle centerline and mounted to the fixed structure. The nozzle defines an inner radial exhaust flow path surface. The nozzle includes a forward ejector door and an aft ejector door disposed about the nozzle centerline and defining a first surface portion of the inner radial flow path surface. Each of the forward ejector door and the aft ejector door are pivotable between respective closed positions in which the forward ejector door contacts the aft ejector door and respective open positions in which the forward ejector door and the aft ejector door are spaced from one another to define a second portion of the ejector passage therebetween. The variable area nozzle assembly further includes a translating ejector sleeve mounted within the fixed structure and configured to translate within the fixed structure between a first position, in which the translating ejector sleeve obstructs the ejector passage, and a second position, in which the translating ejector sleeve is configured to allow air flow through the ejector passage from radially outside the fixed structure to radially inside the nozzle.

In any of the aspects or embodiments described above and herein, the nozzle may further include an A8 door pivotably mounted to the fixed structure. The A8 door may define a second surface portion of the inner radial exhaust flow path surface. The A8 door may be selectively pivotal relative to the nozzle centerline between a first position defining a maximum area of a throat cross-sectional area of the nozzle and a second position defining a minimum area of the throat cross-sectional area of the nozzle.

In any of the aspects or embodiments described above and herein, the forward ejector door may be pivotably mounted to the A8 door at an axial location of the throat cross-sectional area.

In any of the aspects or embodiments described above and herein, the variable area nozzle assembly may further include a first thrust reverser door and a second thrust reverser door. Each of the first thrust reverser door and the second thrust reverser door may be rotatably mounted to the fixed structure at a first thrust reverser door end.

In any of the aspects or embodiments described above and herein, the aft ejector door may be pivotably mounted to the first thrust reverser door and the second thrust reverser door.

In any of the aspects or embodiments described above and herein, a second thrust reverser door end of each of the first thrust reverser door and the second thrust reverser door may be configured to contact the fixed structure when the first thrust reverser door and the second thrust reverser door are in respective stowed positions. The second thrust reverser door end of each of the first thrust reverser door and the second thrust reverser door may be configured to be spaced from the fixed structure when the first thrust reverser door and the second thrust reverser door are in the respective deployed positions.

According to another aspect of the present disclosure, a method for operating a variable area nozzle assembly for a gas turbine engine is provided. The method includes directing air through an ejector passage from radially outside a fixed structure to radially inside a nozzle by (1) axially translating a translating ejector sleeve within the fixed structure between a first axial position, in which the ejector passage is closed, and a second axial position, in which the ejector passage is open, and (2) pivoting a forward ejector door and an aft ejector door between a first ejector door position, in which the forward ejector door is positioned adjacent the aft ejector door, and a second ejector door position, in which the forward ejector door and the aft ejector door are spaced from one another.

In any of the aspects or embodiments described above and herein, the translating ejector sleeve may be configured to effect pivoting of the first ejector door and the second ejector door such that the step of axially translating the translating ejector sleeve from the first position to the second position causes the forward ejector door and the aft ejector door to pivot from the first ejector door position to the second ejector door position.

In any of the aspects or embodiments described above and herein, the forward ejector door may be pivotably mounted to an A8 door of the nozzle which may be selectively pivotal relative to the nozzle centerline between a first A8 position defining a maximum area of a throat cross-sectional area of the nozzle and a second A8 position defining a minimum area of the throat cross-sectional area of the nozzle.

In any of the aspects or embodiments described above and herein, the aft ejector door may be pivotably mounted to a first thrust reverser door and a second thrust reverser door of the variable area nozzle assembly.

The present disclosure, and all its aspects, embodiments and advantages associated therewith will become more readily apparent in view of the detailed description provided below, including the accompanying drawings.

BRIEF DESCRIPTION OF THE DRAWINGS

FIG. 10 illustrates a sectional view of a variable area nozzle assembly showing a translating ejector sleeve in an open position, in accordance with one or more embodiments of the present disclosure.

FIG. 11 illustrates a sectional view of a variable area nozzle assembly showing a translating ejector sleeve in a closed position, in accordance with one or more embodiments of the present disclosure.

DETAILED DESCRIPTION

Figure 1:
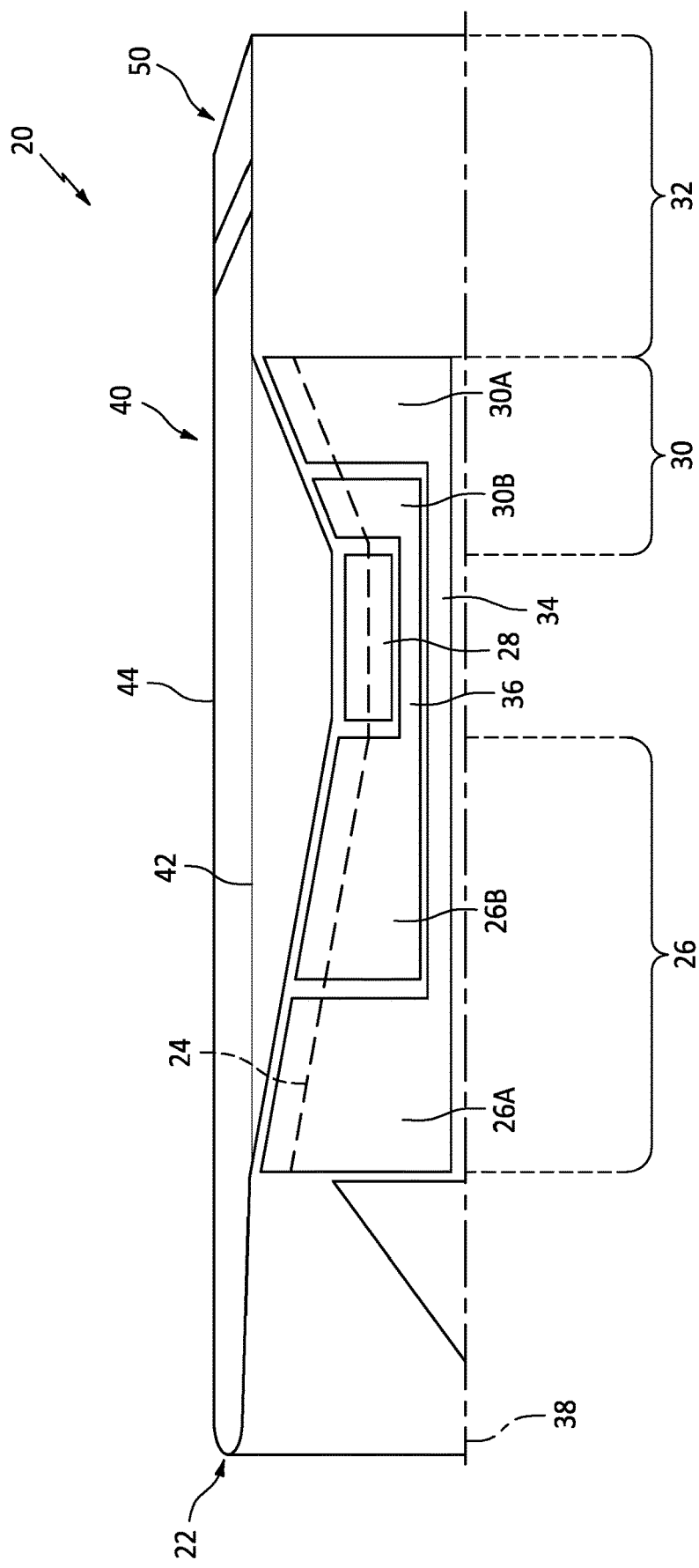
FIG. 1 illustrates a side cutaway view of a gas turbine engine, in accordance with one or more embodiments of the present disclosure.
Figure 2:
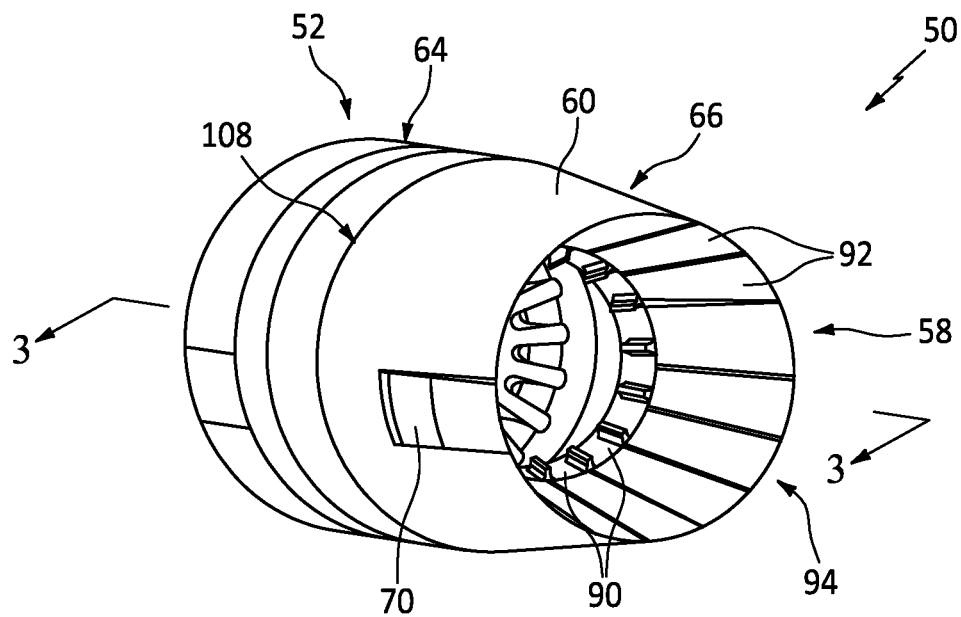
FIG. 2 illustrates a perspective view of a variable area nozzle assembly including a nozzle ejector in a closed position, in accordance with one or more embodiments of the present disclosure.

Referring to FIG. 1, an exemplary gas turbine engine 20 capable of using aspects of the present disclosure is schematically illustrated. Although depicted as a turbojet gas turbine engine in the disclosed non-limiting embodiments, it should be understood that the concepts described herein are not limited to use with turbojets and may be applicable to other configurations of aircraft gas turbine engines as well including, but not limited to turboprop and turbofan gas turbine engines.

The gas turbine engine 20 generally includes an inlet structure 22 through which ambient air is directed into a core flow path 24 of the gas turbine engine 20. The air within the core flow path 24 may be referred to as "core air." The gas turbine engine 20 includes a compressor section 26, for compressing the core air, and a combustor 28 wherein the compressed core air is mixed with fuel and ignited for generating combustion gases. The gas turbine engine 20 further includes a turbine section 30 for extracting energy from the combustion gases. The resultant combustion gases from the combustor 28 are expanded over the turbine section 30 and then exhausted via an exhaust section 32, thereby providing thrust.

The compressor section 26 of the gas turbine engine 20 may include a low-pressure compressor 26A located upstream of a high-pressure compressor 26B. The turbine section 30 may include a high-pressure turbine 30B located upstream of a low-pressure turbine 30A. In one embodiment, the low-pressure compressor 26A may be connected to the low-pressure turbine 30A by a low-pressure shaft 34 and the high-pressure compressor 26B may be connected to the high-pressure turbine 30B by a high-pressure shaft 36. The compressors 26A, 26B, the combustor 28, and the turbines 30A, 30B may typically be concentric about a common axial centerline 38 (e.g., a rotational axis) of the gas turbine engine 20.

The compressor section 26, combustor 28, and turbine section 30 are arranged sequentially along the axial centerline 38 within an engine housing 40. This engine housing 40 includes an engine case 42 and a nacelle 44. The engine case 42 houses one or more of the compressor section 26, combustor 28, and turbine section 30, which may be collectively referred to as an "engine core." The nacelle 44 houses and provides an aerodynamic cover for the engine case 42. The engine housing 40 of FIG. 1 may also form the inlet structure 22 and at least a portion of a variable area nozzle assembly 50 for the exhaust section 32 of the gas turbine engine 20.

Figure 3:
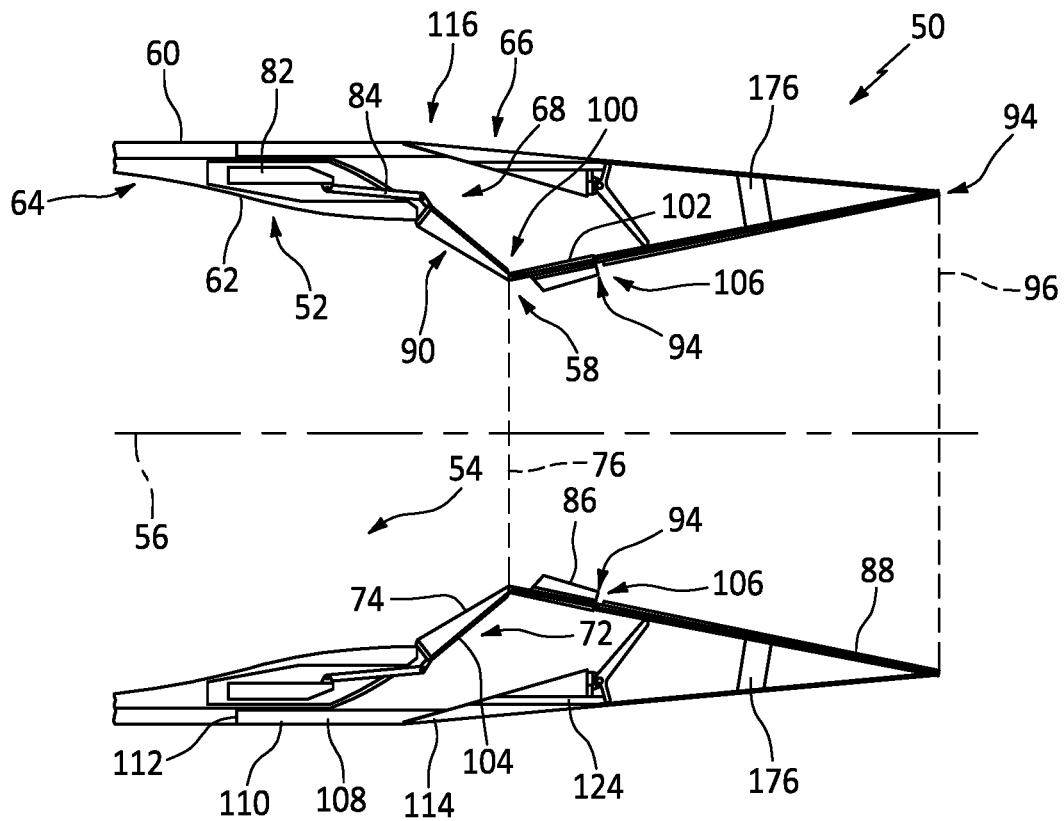
FIG. 3 illustrates a cross-sectional view of the variable area nozzle assembly of FIG. 2 taken along Line 3-3 of FIG. 2, in accordance with one or more embodiments of the present disclosure.
Figure 4:
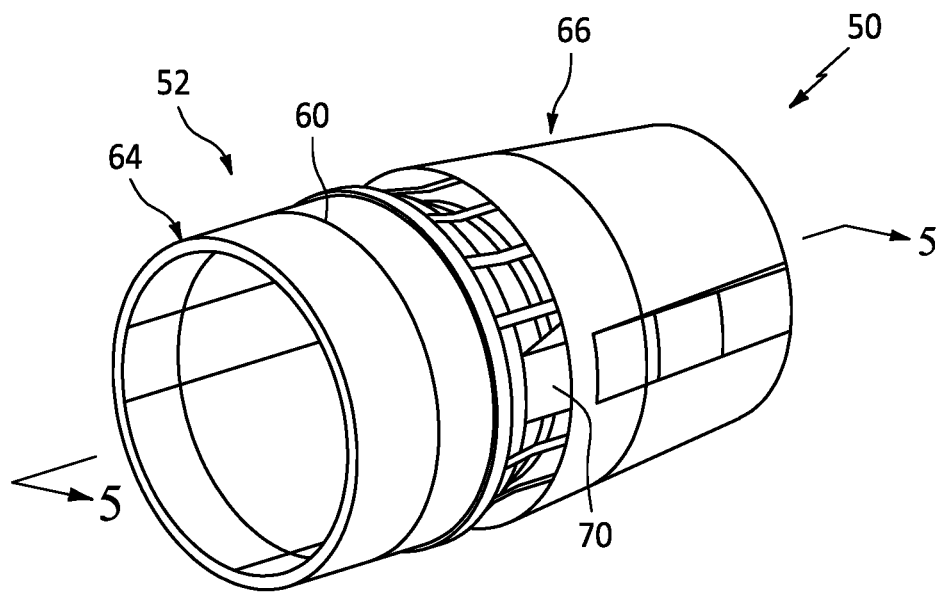
FIG. 4 illustrates a perspective view of a variable area nozzle assembly having a nozzle ejector in an open position, in accordance with one or more embodiments of the present disclosure.

Referring to FIGS. 2-5, aspects of the present disclosure include a variable area nozzle assembly 50 for the exhaust section 32 (see FIG. 1). The variable area nozzle assembly 50 generally includes a fixed structure 52 of the gas turbine engine 20 which may be configured as or otherwise include, for example, portions of the engine housing 40 such as the engine case 42 and/or the nacelle 44, and/or other suitable fixed structure of the gas turbine engine 20. The fixed structure 52 radially surrounds an exhaust duct 54 generally disposed about a nozzle centerline 56 which may or may not be colinear with the axial centerline 38 of the gas turbine engine 20. The variable area nozzle assembly 50 is configured to direct core gases along the flow path 24 from the turbine section 30 and/or bypass gases to a variable area nozzle 58 mounted to the fixed structure 52 and located at a downstream end of the exhaust section 32. The nozzle 58 of FIG. 3 is configured as a convergent-divergent nozzle. However, the present disclosure is not limited to this particular nozzle configuration and aspects of the present disclosure may be applicable to other configurations of variable area nozzles as well.

Figure 12:
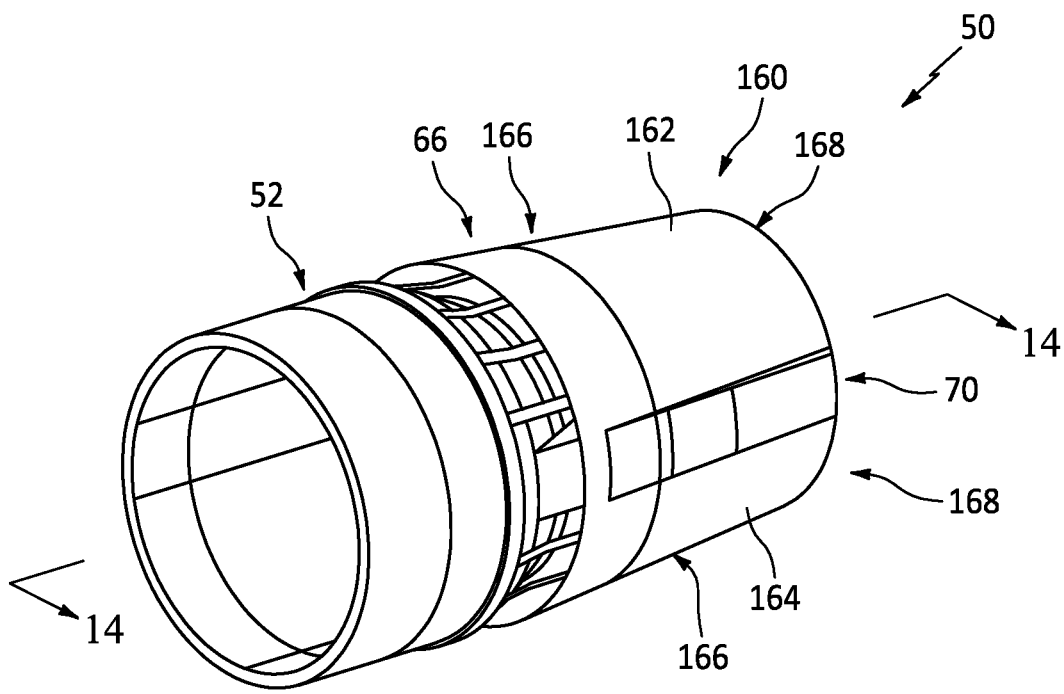
FIG. 12 illustrates a perspective view of a variable area nozzle assembly with thrust reverser doors in a stowed position, in accordance with one or more embodiments of the present disclosure.
Figure 13:
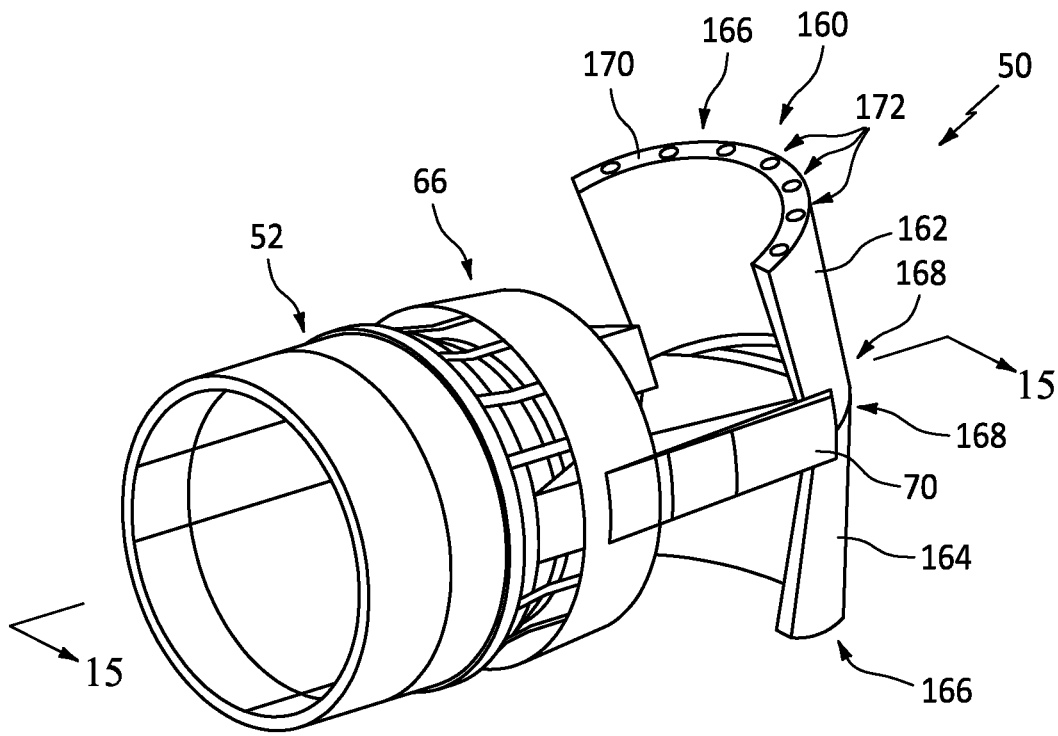
FIG. 13 illustrates a perspective view of a variable area nozzle assembly with thrust reverser doors in a deployed position, in accordance with one or more embodiments of the present disclosure.

The fixed structure 52 has an outer radial side 60 and an inner radial side 62 opposite the outer radial side 60. The outer radial side 60 may form an exterior of the variable area nozzle assembly 50. The fixed structure 52 includes a first fixed ring 64 and a second fixed ring 66 disposed about the nozzle centerline 56. The first fixed ring 64 is axially spaced from the second fixed ring 66 to define a first portion of an ejector passage 68 therebetween and extending from the outer radial side 60 to the inner radial side 62. The second fixed ring 66 may be mounted to the first fixed ring 64 by one or more side beams 70 extending aftward in a generally axial direction from the first fixed ring 64. In some embodiments, for example referring to FIGS. 12 and 13, the side beams 70 may extend aftward past the second fixed ring 66, and may be used to support one or more additional components of the variable area nozzle assembly 50, as will be discussed in further detail.

Referring to FIGS. 2-7, in some embodiments, the nozzle 58 may include an A8 door 72 defining an upstream A8 axial portion of the nozzle 58 which may be a converging portion of the nozzle 58. The A8 door 72 is disposed about the nozzle centerline 56 and defines a portion of an inner radial exhaust flow path surface 74 of the nozzle 58. Additionally, the A8 door 72 may define a throat cross-sectional area 76 of the nozzle 58 at an axially aft (e.g., downstream) end of the A8 door 72. In some embodiments, the A8 structure 72 may be fixedly mounted to the fixed structure 52 and may, therefore, define a fixed area of the throat cross-sectional area 76. In some other embodiments, the A8 structure 72 may include a plurality of petals 78 (e.g., flaps) pivotably mounted to the first fixed ring 64 of the fixed structure 52, relative to the nozzle centerline 56, and configured to define a variable area of the throat cross-sectional area 76 (see FIG. 8).

Figure 6:
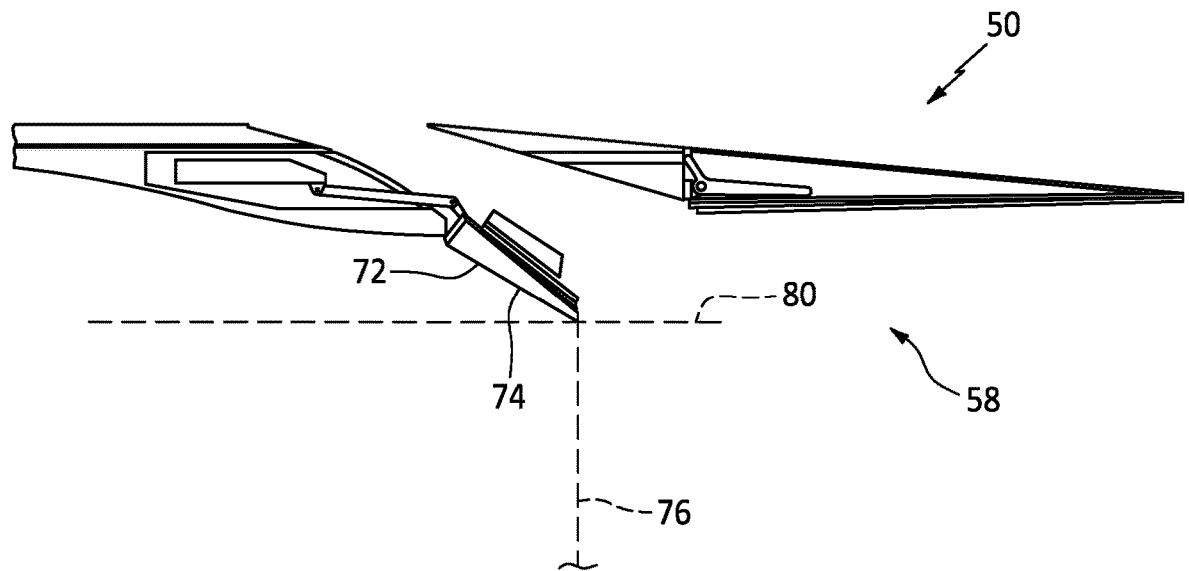
FIG. 6 illustrates a sectional view of a variable area nozzle assembly having a nozzle ejector in an open position and a nozzle in a minimum A8 position, in accordance with one or more embodiments of the present disclosure.
Figure 7:
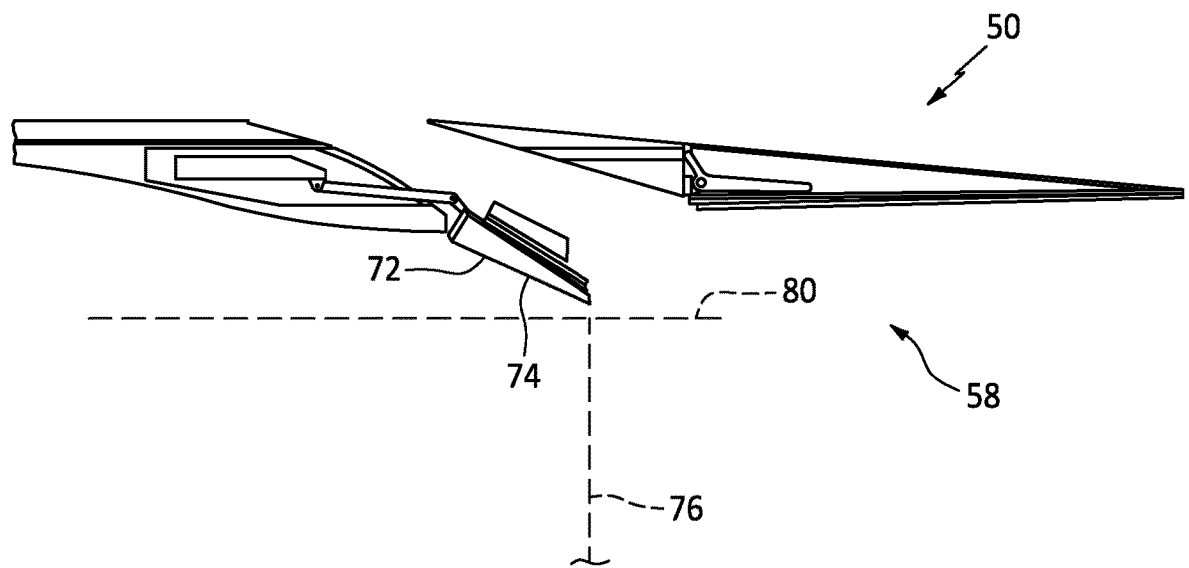
FIG. 7 illustrates a sectional view of a variable area nozzle assembly having a nozzle ejector in an open position and a nozzle in a maximum A8 position, in accordance with one or more embodiments of the present disclosure.

The petals 78 of the A8 door 72 of the nozzle 60 may be actuated to selectively vary the areas of the throat cross-sectional area 76. As shown in FIG. 6, for example, the A8 door 72 is in a radially innermost position such that the inner radial exhaust flow path surface 74 defines a minimum area of the throat cross-sectional area 76 (e.g., a minimum A8 position). For reference, an exemplary minimum A8 position of the A8 door 72 is represented in FIGS. 6 and 7 by the dashed line 80. As shown in FIG. 7, for example, the A8 door 72 is in a radially outermost position such that the inner radial exhaust flow path surface 74 defines a maximum area of the throat cross-sectional area 76 (e.g., a maximum A8 position).

Figure 8:
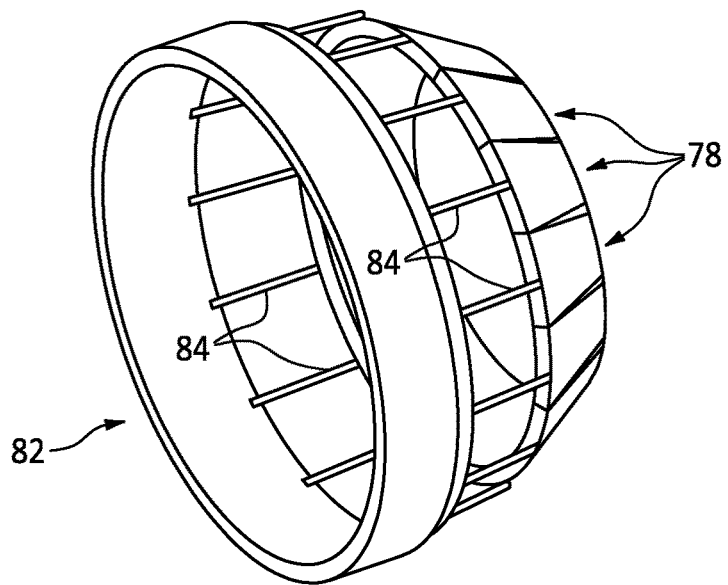
FIG. 8 illustrates a perspective view of a sync ring and an A8 door for a variable area nozzle assembly, in accordance with one or more embodiments of the present disclosure.
Figure 9:
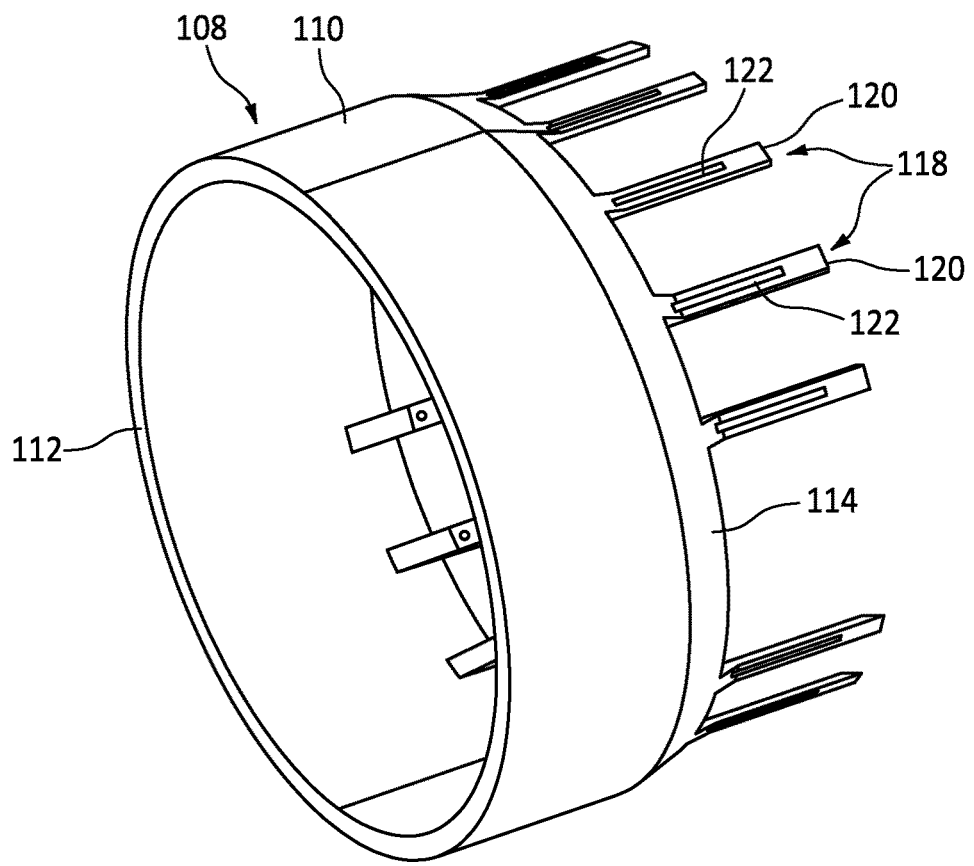
FIG. 9 illustrates a perspective view of a translating ejector sleeve for a variable area nozzle assembly, in accordance with one or more embodiments of the present disclosure.

Referring to FIGS. 2-5 and 8, in some embodiments, the petals 78 of the A8 door 72 may be actuated by a sync ring 82, as shown in FIG. 8. The sync ring 82 may be disposed about the nozzle centerline 56 and mounted within the first fixed ring 64 of the fixed structure 52. The sync ring 82 may be configured for translation (e.g., axial translation) within the first fixed ring 64 so as to move the petals 78 of the A8 door 72 between the minimum A8 position, the maximum A8 position, and a plurality of A8 positions therebetween. For example, the sync ring 82 may be connected to each of the petals 78 of the A8 door 72 by a linkage 84 which may extend through a respective slot (not shown) in the first fixed ring 64.

Referring to FIGS. 2-5, the nozzle 58 includes a forward ejector door 86 and an aft ejector door 88 further defining the inner radial exhaust flow path surface 74 of the nozzle 58. The ejector doors 86, 88 define a downstream A9 axial portion of the nozzle 58 which may be a diverging portion of the nozzle 58. The forward ejector door 86 includes a plurality of petals 90 circumferentially disposed about the nozzle centerline 56. Similarly, the aft ejector door 88 includes a plurality of petals 92 circumferentially disposed about the nozzle centerline 56. A downstream end 94 of the aft ejector door 88 defines an outlet cross-sectional area 96 of the nozzle 58. In some embodiments, the A8 door 72, the forward ejector door 86, and the aft ejector door 88 may include a same number of petals 78, 90, 92, whereas in some other embodiments, the number of petals 78, 90, 92 for each of the A8 door 72, the forward ejector door 86, and the aft ejector door 88 may be different from one another.

Figure 5:
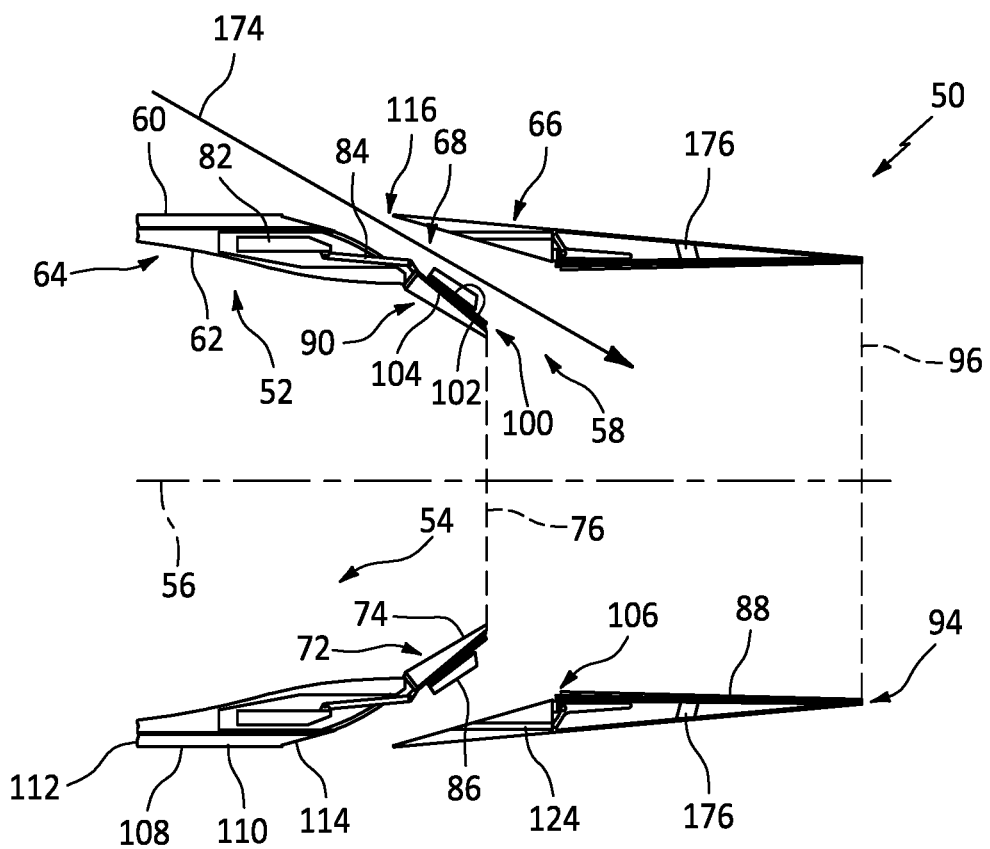
FIG. 5 illustrates a cross-sectional view of the variable area nozzle assembly of FIG. 4 taken along Line 5-5 of FIG. 4, in accordance with one or more embodiments of the present disclosure.

Each of the forward ejector door 86 and the aft ejector door 88 are pivotable between respective first positions (e.g., closed positions), in which the ejector doors 86, 88 are disposed adjacent one another to define a continuous or substantially continuous inner radial exhaust flow path surface 74 of the nozzle 58 (see, e.g., FIG. 3), and respective second positions (e.g., open positions), in which the ejector doors 86, 88 are spaced from one another to define a second portion of the ejector passage 68 therebetween (see, e.g., FIG. 5). In some embodiments, the nozzle 58 may include a circumferentially-extending seal member 94 mounted to one of the forward ejector door 86 or the aft ejector door 88 and configured to be positioned between the ejector doors 86, 88 when the ejector doors 86, 88 are in their respective closed positions to provide a seal between the ejector doors 86, 88.

In some embodiments including the A8 door 72, an upstream end of the forward ejector door 86 may be pivotably mounted to a downstream end of the A8 door 72. For example, petals 90 of the forward ejector door 86 may be pivotably mounted to petals 78 of the A8 door 72 at respective pivot joints 100. As such, the forward ejector door 86 may be configured to pivot between the closed position and an open position in which an outer surface 102 of the forward ejector door 86 is positioned in contact with and/or adjacent an outer surface 104 of the A8 door 72. In some other embodiments, such as those without an A8 door, the forward ejector door 86 may alternatively be pivotably mounted to the first fixed ring 64 of the fixed structure 52.

In some embodiments, the downstream end 94 of the aft ejector door 88 may be pivotably mounted to the second fixed ring 66 of the fixed structure 52. For example, petals 92 of the aft ejector door 88 may be pivotably mounted to second fixed ring 66. As such, the aft ejector door 88 may be configured to pivot between the closed position, in which an upstream end 106 of the aft ejector door 88 may be positioned in contact with or proximate the forward ejector door 86 (see, e.g., FIG. 3), and the open position, in which the upstream end 106 is displaced radially outward, relative to the position of the upstream end 106 with the aft ejector door 88 in the closed position, and in which the upstream end 106 may be disposed proximate or in contact with the second fixed ring 66 (see, e.g., FIG. 5). In some embodiments, the aft ejector door 88 may be biased to the open position, for example, by one or more spring mechanisms 176 (e.g., a spring or spring cartridge) extending between the second fixed ring 66 and the aft ejector door 88. In other embodiments, the spring mechanism 176 may include a torsion spring in contact with the second fixed ring 66 and the aft ejector door 88 along the pivot joint formed between the second fixed ring 66 and the aft ejector door 88 at the downstream end 94.

Referring to FIGS. 2-5 and 9, the present disclosure variable area nozzle assembly 50 further includes a translating ejector sleeve 108 mounted to the fixed structure 52 and disposed about the nozzle centerline 56. The translating ejector sleeve 108 is configured to axially translate within the fixed structure 52 between a first axial position in which the ejector passage 68 is closed (e.g., a closed position of the translating ejector sleeve 108) and a second axial position in which the ejector passage 68 is open (e.g., an open position of the translating ejector sleeve 108). In the closed position, the translating ejector sleeve 108 obstructs the ejector passage 68, thereby preventing or substantially preventing the passage of air through the first portion of the ejector passage 68 between the first fixed ring 64 and the second fixed ring 66, as shown in FIG. 3. In the open position, the translating ejector sleeve 108 permits passage of air through the ejector passage 68 between the first fixed ring 64 and the second fixed ring 66, as shown in FIG. 5. The translating ejector sleeve 108 includes a sleeve body 110 having a forward axial end 112 and an aft axial end 114. In the closed position, the aft axial end 114 may contact the second fixed ring 66, whereas in the open position, the aft axial end 114 may be axially spaced from the second fixed ring 66.

The translating ejector sleeve 108, the forward ejector door 86, the aft ejector door 88, and the ejector passage 68 of the present disclosure variable area nozzle assembly 50 define, at least in part, an exhaust nozzle ejector 116 of the variable area nozzle assembly 50. The exhaust nozzle ejector 116 is configured to selectively introduce airflow from outside the variable area nozzle assembly 50 (e.g., a source of relatively higher-pressure air) into a relatively low-pressure region within the interior of the nozzle 60 via the ejector passage 68, for example, along the air flow path 174. Introduction of relatively higher-pressure air into the nozzle 60 may be used to energize a slower radially outer stream of exhaust gases passing through the nozzle 60, thereby enhancing nozzle 60 thrust. Accordingly, the exhaust nozzle ejector 116 of the present disclosure may be configured to operate so as to optimize engine performance during various flight conditions of an aircraft (e.g., subsonic or supersonic flight) while also providing a compact configuration within the variable area nozzle assembly 50.

In some embodiments, the translating ejector sleeve 108 may include a plurality of projecting members 118 circumferentially spaced from one another about the nozzle centerline 56. Each of the plurality of projecting members 118 may extend in an aftward axial direction from the aft axial end 114 of the sleeve body 110 to a distal end 120. Each of the plurality of projecting members 118 may include a slot 122 extending radially therethrough. In some embodiments, the second fixed ring 66 may include a plurality of axial passages 124 circumferentially aligned with the plurality of projecting members 118. The plurality of axial passages 124 may allow the respective plurality of projecting members 118 to axially translate within and through the second fixed ring 66, as will be discussed in greater detail.

Referring to FIGS. 10 and 11, in some embodiments, the exhaust nozzle ejector 116 of the variable area nozzle assembly 50 may include an ejector actuation system 126. The ejector actuation system 126 may include an array of linkages configured to selectively position the various components of the exhaust nozzle ejector 116 for open and closed conditions of the exhaust nozzle ejector 116. Accordingly, the exemplary actuation system 126 shown in FIGS. 10 and 11 includes a plurality of circumferentially spaced linkage assemblies 128, one of which is shown in FIGS. 10 and 11. Each linkage assembly 128 includes a first ejector linkage 130, a second ejector linkage 132, a forward ejector door crank 134, and an aft ejector door crank 136. The first ejector linkage 128 includes a first end 138 rotatably mounted to a respective projecting member 118 of the translating ejector sleeve 108 within the slot 122 of the respective projecting member 118. The axial length of the slot 122 may be sufficient to encompass the length of the first ejector linkage 128 therein. A second end 140 of the first ejector linkage 130 is rotatably mounted to a first end 142 of the forward ejector door crank 134. A second end 144 of the forward ejector door crank 134 is rotatably mounted to the A8 door 72, to a respective petal of the plurality of petals 78 for the A8 door 72 (as shown in FIGS. 10 and 11), or to the first fixed ring 64. The second ejector linkage 132 includes a first end 146 rotatably mounted to an intermediate portion of the forward ejector door crank 134 between the first end 142 and the second end 144. The second ejector linkage 132 includes a second end 148 rotatably mounted to a respective petal of the plurality of petals 90 for the forward ejector door 86. In some embodiments, the forward ejector door 86 and/or the A8 door 72 may include a slot (not shown) in which the second ejector linkage 132 and/or the forward ejector door crank 134 may be at least partially disposed throughout the range of motion of the second ejector linkage 132 and/or the forward ejector door crank 134. In some embodiments, the aft ejector door crank 136 may be rotatably mounted to the second fixed ring 66 at a pivot point 150 of the aft ejector door crank 136. The aft ejector door crank 136 may include a first portion 152 generally extending in a direction away from the pivot point 150 to a first end 154. The aft ejector door crank 136 may further include a second portion 156 generally extending in a direction away from the pivot point 150, and transverse to the direction of the first portion 152, to a second end 158.

Actuation of the translating ejector sleeve 108 from the closed position (see FIG. 11) to the open position (see FIG. 10) effects movement of the forward ejector door 86 and the aft ejector door 88 to their respective open positions via the ejector actuation system 126. As shown in FIG. 10, with the translating ejector sleeve 108 in the open position, each of the projecting members 118 is disengaged from the first portion 152 of each aft ejector door crank 136, thereby allowing spring force biasing of the aft ejector door 88 to the open position.

Similarly, actuation of the translating ejector sleeve 108 from the open position (see FIG. 10) to the closed position (see FIG. 11) effects movement of the forward ejector door 86 and the aft ejector door 88 to their respective closed positions via the ejector actuation system 126. As shown in FIG. 11, with the translating ejector sleeve 108 in the closed position, each of the projecting members 118 extends through a respective one of the passages 124 of the second fixed ring 66 to engage the first portion 152 of each aft ejector door crank 136, thereby rotating the aft ejector door crank 136 so that the second portion 156 of the aft ejector door crank 136 forces the aft ejector door 88 to the closed position (e.g., against a spring force biasing the aft ejector door 88 to the open position).

Referring to FIGS. 12-15, in some embodiments, the variable area nozzle assembly 50 may include a thrust reverser system 160. The thrust reverser system 160 may be configured, for example, as a post-exit thrust reverser as shown in FIGS. 12-15. The thrust reverser system 160 may include a first thrust reverser door 162 and a second thrust reverser door 164. Each of the thrust reverser doors 162, 164 extend between a forward end 166 and an aft end 168. The thrust reverser doors 162, 164 are pivotably mounted to the side beams 70 of the fixed structure 52 at or proximate the respective aft ends 168 of the thrust reverser doors 162, 164 and at a position of the side beams 70 which is axially aft of the second fixed ring 66. Accordingly, the thrust reverser doors 162, 164 are configured to pivot between a stowed position (see FIGS. 12 and 14) and a deployed position (see FIGS. 13 and 15) in which the thrust reverser doors 162, 164 are positioned axially aft of the nozzle 58 to block and/or deflect exhaust gases exiting the nozzle 58. In the stowed position, the respective forward ends 166 of the thrust reverser doors 162, 164 may contact or otherwise be positioned proximate the second fixed ring 66. In some embodiments, the thrust reverser doors 162, 164 may include a circumferentially-extending flange member 170 located along the respective forward ends 166 of the thrust reverser doors 162, 164. In the stowed position, the flange member 170 of the thrust reverser doors 162, 164 may be mounted against the second fixed ring 66.

Figure 14:
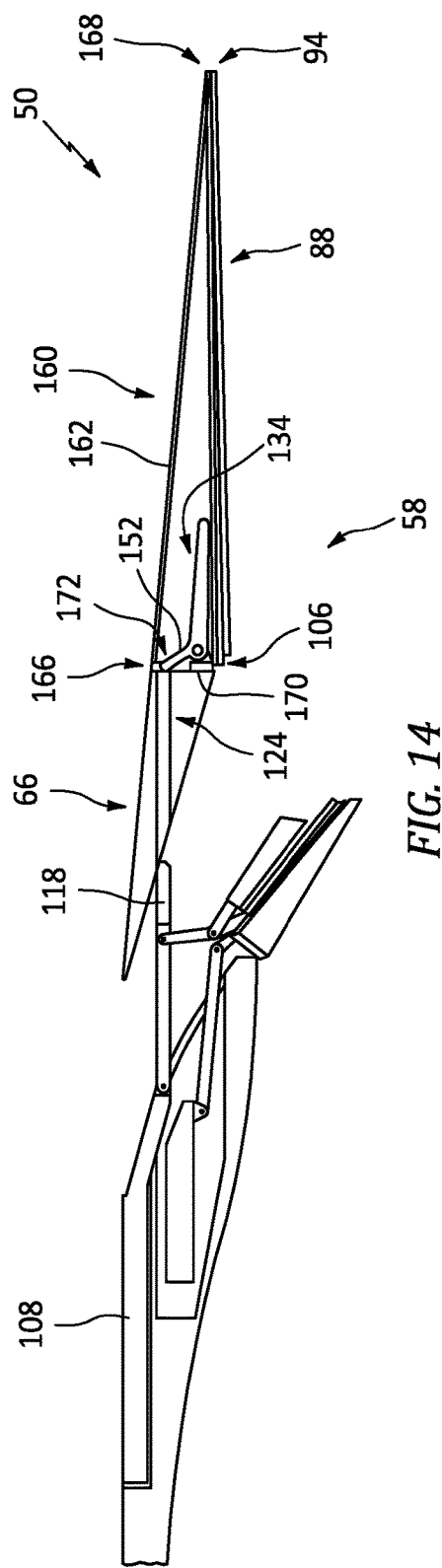
FIG. 14 illustrates a cross-sectional view of a portion of the variable area nozzle assembly of FIG. 12 taken along Line 14-14 of FIG. 12, in accordance with one or more embodiments of the present disclosure.
Figure 15:
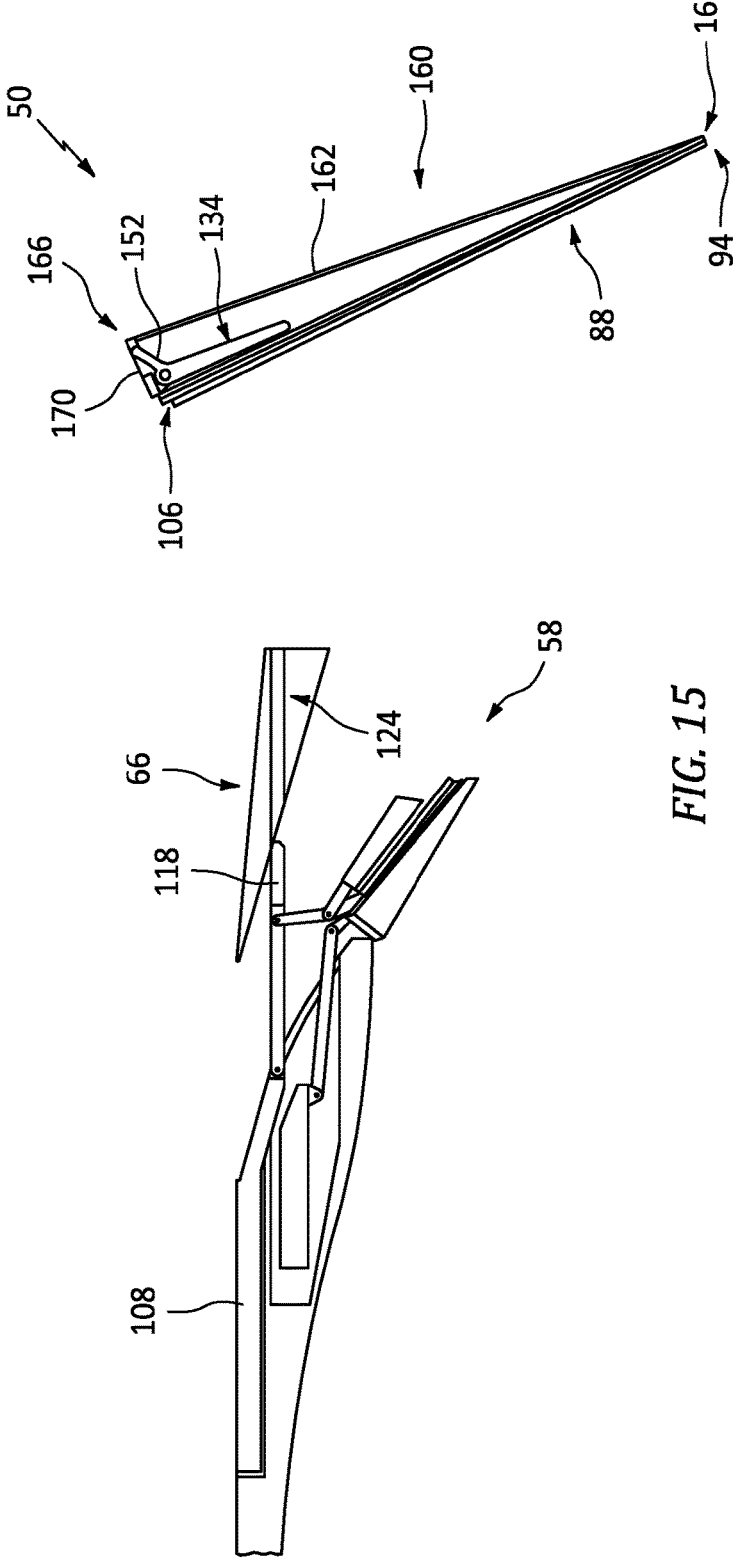
FIG. 15 illustrates a cross-sectional view of a portion of the variable area nozzle assembly of FIG. 13 taken along Line 15-15 of FIG. 13, in accordance with one or more embodiments of the present disclosure.

As shown in FIG. 14, the aft ejector door crank 134 of each linkage assembly 128 may be pivotably mounted to one of the thrust reverser doors 162, 164. For example, the aft ejector door crank 134 may be pivotably mounted to a portion of the flange member 170. The flange member 170 may include a plurality of apertures 172 extending through the flange member 170. With the thrust reverser doors 162, 164 in the stowed position, the plurality of apertures 172 may be aligned with the plurality of axial passages 124 of the second fixed ring 66 as well as with respective aft ejector door cranks 134 of the plurality of linkage assemblies 128. Accordingly, the plurality of projecting members 118 may axially translate within and through the axial passages 124 of the second fixed ring 66 and the plurality of apertures 172 aligned therewith, to engage or disengage the first portion 152 of each aft ejector door crank 136, as previously discussed. Further still, with the translating ejector sleeve 108 in the closed position, the plurality of projecting members 118 may extend through respective apertures of the plurality of apertures 172 in the flange member 170. In this state, the plurality of projecting members 118 may function as a locking device to securely retain the thrust reverser doors 162, 164 in the stowed position (e.g., to prevent the thrust reverser doors 162, 164 from pivoting from the stowed position toward the deployed position).

The downstream end 94 of the aft ejector door 88 may be pivotably mounted to the thrust reverser doors 162, 164. For example, each of the petals 92 of the aft ejector door 88 may be pivotably mounted to one of the thrust reverser doors 162, 164. As such, the aft ejector door 88 may be configured to pivot between the closed position, in which an upstream end 106 of the aft ejector door 88 may be positioned in contact with or proximate the forward ejector door 86 (see, e.g., FIG. 3), and the open position, in which the upstream end 106 is displaced radially outward, relative to the position of the upstream end 106 with the aft ejector door 88 in the closed position, and in which the upstream end 106 may be disposed proximate or in contact with the flange member 170 (see, e.g., FIG. 14). In some embodiments, the aft ejector door 88 may be biased to the open position, for example, by one or more springs (not shown). Because the aft ejector door 88 and aft ejector door cranks 134 are mounted to the thrust reverser doors 162, 164, the thrust reverser system 160, including the combination of the thrust reverser doors 162, 164, aft ejector door 88, and aft ejector door cranks 134, may be configured to pivot between the stowed position and the deployed position of the thrust reverser doors 162, 164 together, as shown in FIGS. 12-15.

The variable area nozzle assembly 50 may include actuators (e.g., hydraulic, pneumatic, electro-mechanical actuators) configured for moving various components of the variable area nozzle 58, which are well known in the art. For the sake of clarity, these actuators have been omitted from the figures and description herein and the present disclosure is not limited to any particular actuator configuration for actuation of the sync ring 82, the translating ejector sleeve 108, and the thrust reverser doors 162, 164.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A variable area nozzle assembly for a gas turbine engine, the variable area nozzle assembly comprising:
    a fixed structure comprising a first fixed ring and a second fixed ring disposed about a nozzle centerline, the second fixed ring spaced axially aft from the first fixed ring to define a first portion of an ejector passage therebetween;
    a nozzle disposed about the nozzle centerline and defining an inner radial exhaust flow path surface, the nozzle comprising a forward ejector door and an aft ejector door disposed about the nozzle centerline, the forward ejector door and the aft ejector door defining a first surface portion of the inner radial exhaust flow path surface, each of the forward ejector door and the aft ejector door being pivotable between respective closed positions, in which the forward ejector door is positioned adjacent the aft ejector door, and respective open positions, in which the forward ejector door and the aft ejector door are spaced from one another to define a second portion of the ejector passage therebetween; and
    a translating ejector sleeve mounted within the fixed structure and configured to axially translate within the fixed structure between a first axial position, in which the ejector passage is closed, and a second axial position, in which the ejector passage is open such that the ejector passage is configured to allow air flow therethrough from radially outside the fixed structure to radially inside the nozzle,
    wherein the nozzle further comprises an A8 door pivotably mounted to the first fixed ring, the A8 door defining a second surface portion of the inner radial exhaust flow path surface, the A8 door being selectively pivotal relative to the nozzle centerline between a first A8 position defining a maximum area of a throat cross-sectional area of the nozzle and a second A8 position defining a minimum area of the throat cross-sectional area of the nozzle.

2. The variable area nozzle of claim 1, wherein the translating ejector sleeve is configured to effect pivoting of the forward ejector door and the aft ejector door such that axial translation of the translating ejector sleeve from the first axial position to the second axial position causes the forward ejector door and the aft ejector door to pivot from the respective closed positions to the respective open positions.

3. The variable area nozzle of claim 1, wherein an aft end of the aft ejector door defines an outlet cross-sectional area of the nozzle.

4. The variable area nozzle of claim 1, wherein the nozzle further comprises a seal member positioned between the forward ejector door and the aft ejector door and configured to provide a seal between the forward ejector door and the aft ejector door when the forward ejector door and the aft ejector door are in the respective closed positions.

5. The variable area nozzle of claim 1, wherein the forward ejector door is pivotably mounted to the A8 door.

6. The variable area nozzle of claim 1, further comprising a first thrust reverser door and a second thrust reverser door, each of the first thrust reverser door and the second thrust reverser door rotatably mounted to the fixed structure at a first thrust reverser door end.

7. The variable area nozzle of claim 6, wherein the aft ejector door is pivotably mounted to the first thrust reverser door and the second thrust reverser door.

8. The variable area nozzle of claim 6, wherein a second thrust reverser door end of each of the first thrust reverser door and the second thrust reverser door is configured to contact the second fixed ring when the first thrust reverser door and the second thrust reverser door are in respective stowed positions.

9. The variable area nozzle of claim 8, the aft ejector door is configured to rotate with the first thrust reverser door and the second thrust reverser door from the respective stowed positions of the first thrust reverser door and the second thrust reverser door to respective deployed positions of the first thrust reverser door and the second thrust reverser door.

10. A variable area nozzle assembly for a gas turbine engine, the variable area nozzle assembly comprising:
a fixed structure disposed about a nozzle centerline and defining a first portion of an ejector passage extending from an outer radial side of the fixed structure to an inner radial side of the fixed structure;
a nozzle disposed about the nozzle centerline and mounted to the fixed structure, the nozzle defining an inner radial exhaust flow path surface, the nozzle comprising a forward ejector door and an aft ejector door disposed about the nozzle centerline and defining a first surface portion of the inner radial flow path surface, each of the forward ejector door and the aft ejector door being pivotable between respective closed positions in which the forward ejector door contacts the aft ejector door and respective open positions in which the forward ejector door and the aft ejector door are spaced from one another to define a second portion of the ejector passage therebetween;
a translating ejector sleeve mounted within the fixed structure and configured to translate within the fixed structure between a first position, in which the translating ejector sleeve obstructs the ejector passage, and a second position, in which the translating ejector sleeve is configured to allow air flow through the ejector passage from radially outside the fixed structure to radially inside the nozzle; and
a first thrust reverser door and a second thrust reverser door, each of the first thrust reverser door and the second thrust reverser door rotatably mounted to the fixed structure at a first thrust reverser door end;
wherein the aft ejector door is pivotably mounted to the first thrust reverser door and the second thrust reverser door.

11. The variable area nozzle of claim 10, wherein the nozzle further comprises an A8 door pivotably mounted to the fixed structure, the A8 door defining a second surface portion of the inner radial exhaust flow path surface, the A8 door being selectively pivotal relative to the nozzle centerline between a first position defining a maximum area of a throat cross-sectional area of the nozzle and a second position defining a minimum area of the throat cross-sectional area of the nozzle.

12. The variable area nozzle of claim 11, wherein the forward ejector door is pivotably mounted to the A8 door at an axial location of the throat cross-sectional area.

13. The variable area nozzle of claim 10, wherein a second thrust reverser door end of each of the first thrust reverser door and the second thrust reverser door is configured to contact the fixed structure when the first thrust reverser door and the second thrust reverser door are in respective stowed positions and wherein the second thrust reverser door end of each of the first thrust reverser door and the second thrust reverser door is configured to be spaced from the fixed structure when the first thrust reverser door and the second thrust reverser door are in respective deployed positions.

14. A variable area nozzle assembly for a gas turbine engine, the variable area nozzle assembly comprising:
a fixed structure comprising a first fixed ring and a second fixed ring disposed about a nozzle centerline, the second fixed ring spaced axially aft from the first fixed ring to define a first portion of an ejector passage therebetween;
a nozzle disposed about the nozzle centerline and defining an inner radial exhaust flow path surface, the nozzle comprising a forward ejector door and an aft ejector door disposed about the nozzle centerline, the forward ejector door and the aft ejector door defining a first surface portion of the inner radial exhaust flow path surface, each of the forward ejector door and the aft ejector door being pivotable between respective closed positions, in which the forward ejector door is positioned adjacent the aft ejector door, and respective open positions, in which the forward ejector door and the aft ejector door are spaced from one another to define a second portion of the ejector passage therebetween; and
a translating ejector sleeve mounted within the fixed structure and configured to axially translate within the fixed structure between a first axial position, in which the ejector passage is closed, and a second axial position, in which the ejector passage is open such that the ejector passage is configured to allow air flow therethrough from radially outside the fixed structure to radially inside the nozzle;
a first thrust reverser door and a second thrust reverser door, each of the first thrust reverser door and the second thrust reverser door rotatably mounted to the fixed structure at a first thrust reverser door end;
wherein a second thrust reverser door end of each of the first thrust reverser door and the second thrust reverser door is configured to contact the second fixed ring when the first thrust reverser door and the second thrust reverser door are in respective stowed positions.

15. The variable area nozzle of claim 14, the aft ejector door is configured to rotate with the first thrust reverser door and the second thrust reverser door from the respective stowed positions of the first thrust reverser door and the second thrust reverser door to respective deployed positions of the first thrust reverser door and the second thrust reverser door.

* * * * *